Figure 1:
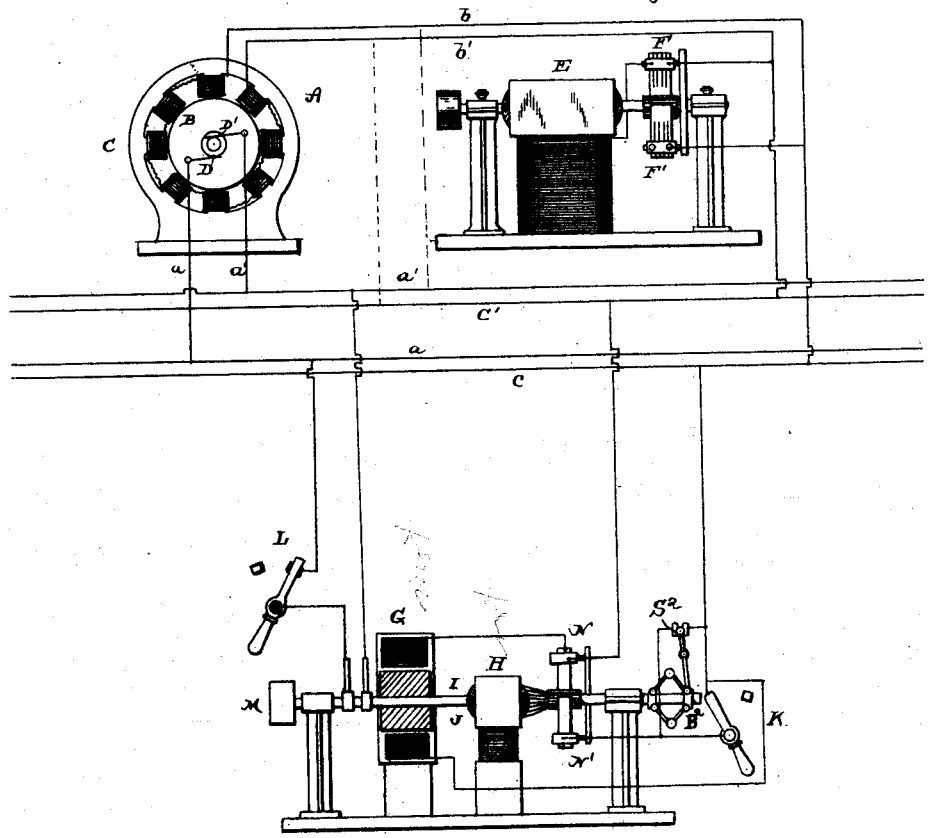

(No Model.) 2 Sheets—Sheet 1.

E. W. RICE, Jr.
TRANSMISSION OF POWER BY ELECTRICITY.

No. 421,193. Patented Feb. 11, 1890.

Witnesses
Ira R. Steward
Wm. H. Capel

Inventor
E. Wilbur Rice, Jr.
By his Attorneys
Townsend MacArthur (No Model.) 2 Sheets—Sheet 2.
E. W. RICE, Jr.
TRANSMISSION OF POWER BY ELECTRICITY.
No. 421,193. Patented Feb. 11, 1890.
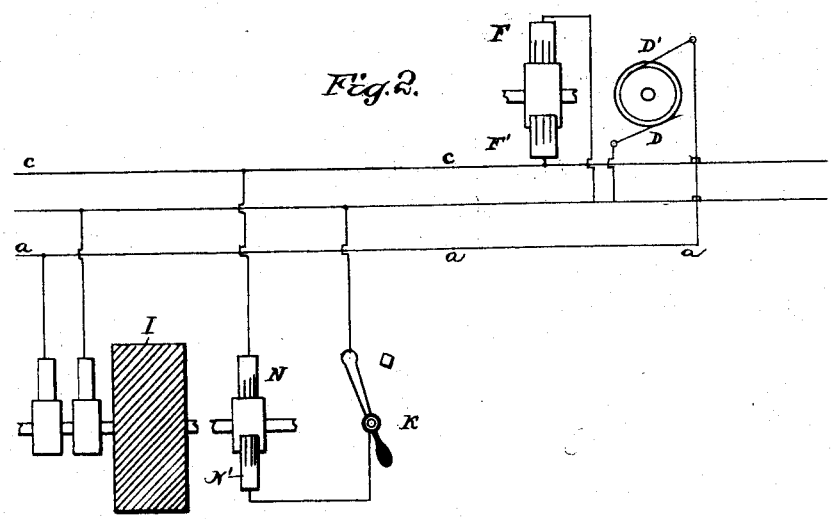
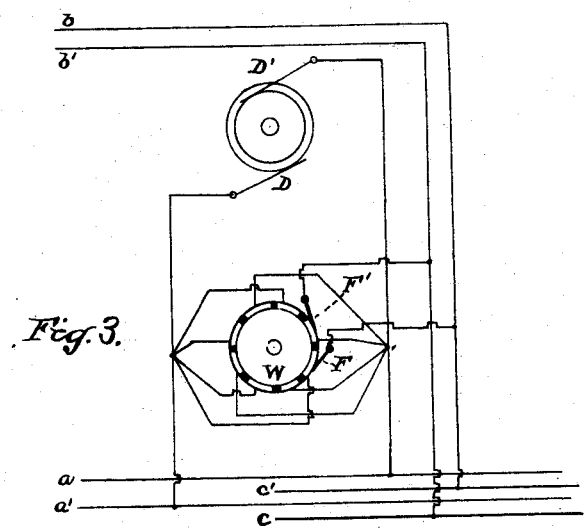
Witnesses
Ira R. Steward
H. A. Capel
Inventor
E. Wilbur Rice, Jr.
By his Attorneys
Townsend MacArthur

UNITED STATES PATENT OFFICE.

EDWIN WILBUR RICE, JR., OF LYNN, MASSACHUSETTS.

TRANSMISSION OF POWER BY ELECTRICITY.

SPECIFICATION forming part of Letters Patent No. 421,193, dated February 11, 1890.

Application filed July 26, 1888. Serial No. 281,058. (No model.)

*To all whom it may concern:*

Be it known that I, EDWIN WILBUR RICE, Jr., a citizen of the United States, and a resident of Lynn, in the county of Essex and State of Massachusetts, have invented a certain new and useful System of Power-Distribution, of which the following is a specification.

My invention relates to systems of electric-power distribution in which alternating currents are employed; and it consists more particularly in the means for bringing the alternating-current motor up to the speed proper for connection of the motor to the alternating-current-supply wire.

My invention consists, also, in the combinations of alternating dynamos, direct or continuous dynamos, and motors, which will be more particularly hereinafter described, and then specified in the claims.

In the accompanying drawings I have illustrated diagrammatically in Figure 1 apparatus embodying my invention. Fig. 2 illustrates an arrangement in which but three supply-mains are required in place of the four indicated in Fig. 1. Fig. 3 illustrates a modification in which the source of continuous currents is a commutator supplied with alternating currents from the alternating dynamo of Fig. 1.

In Fig. 1, A indicates an alternating-current dynamo of any desired construction. C is the field-magnet of the same; B, the armature; D D', the brushes which bear upon the usual collecting-rings and take up the alternating currents from the armature. The brushes D D' connect to the usual wires $a$ $a'$, forming distributing-mains, to which the alternating-current motor or motors are connected.

G indicates an alternating-current motor of a description well known in the art and resembling in all essential respects the dynamo A, in so far as it embodies an armature I, having coils connected directly with the circuit without the intervention of a commutator and a series of field-magnet poles of alternately north and south polarity. An alternating-current motor of this kind requires, as is well understood in the art, to be brought up to a certain critical speed before it may be properly operated from the alternating-current mains, such speed being that requisite for producing changes in the presentation of the armature to the poles with a rapidity corresponding to the alternations of current on the mains. The connection of the motor with the mains is governed by an electric switch L of any suitable description. The field of the motor is supplied with a continuous or direct current from any suitable source—as, for instance, from mains or wires $c$ $c'$, which derive their current from a continuous or direct current dynamo E, the commutator-brushes of which are indicated at F F'.

The dynamos A and E are supposed to be located at the power station and the motor to be at any desired distance from such dynamos.

In order to sustain the field of the dynamo A, I employ a part of the continuous current delivered by the dynamo E. The wires or connections for this purpose are indicated at $b$ $b'$, and may be joined, as shown, to the brushes F F' or to the mains $c$ $c'$.

Connected with the shaft of the armature I for the motor is another electric motor H, which is preferably one adapted to be driven by direct or continuous currents. I prefer to make the connection proper for driving the armature I from motor H by mounting the motor-armatures I J upon the same shaft. The commutator-brushes for the motor H are indicated at N N', and are of any suitable description. They are supposed, like ordinary motor commutator-brushes, to be so constructed that they may be removed from connection with the commutator-cylinder when desired. The current which runs the motor H is obtained from wires or mains $c$ $c'$, supplied by the dynamo E at the power station.

K indicates a suitable electric switch governing the connection of the motor H with the wires supplying current to it. The motor H may be of any suitable size proper for revolving the armature I at the required speed when the motor G is disconnected from the work. The switch L being open, the switch K is closed to start the motor H and revolve the armature I without any external load or work upon the latter. When the armature I has reached the proper speed, the switch L is closed and the alternating current derived from mains $a\ a'$ continues the rotation of the shaft for motor G. The current of the motor H may be then discontinued. At the same time the brushes N N' may be removed from connection with the commutator-cylinder.

It is of course to be understood that the motor H is not intended to supplant or act as a substitute for the motor G, but is only of the requisite capacity for driving the motor G and bringing it up to speed.

Instead of employing a hand-switch K for throwing off the motor H when the desired speed is reached, I may employ an automatic device responsive to the speed of the motor. Such a device consists of an ordinary centrifugal governor $B^2$, the movable head of which operates upon a switch $S^2$, to govern the connections of the motor in the same manner as the switch K. When the armature-shaft J is at rest, the switch $S^2$ closes the circuit to the continuous-current motor H; but when the speed rises to the requisite or determinate amount the centrifugal governor will have moved the switch $S^2$ sufficiently far to open the connection to motor H, and will maintain the switch in such condition so long as the motor G is operated at its proper speed.

It is obvious that the alternating-current dynamo A and the continuous or direct current dynamo E may be of any desired construction.

I do not limit myself to any particular form of continuous-current motor H.

It is obvious likewise that instead of using four distributing-wires $a\ a'\ c\ c'$, three might be employed, one of said wires serving as a common return-wire for the alternating and continuous currents. Such an arrangement is indicated diagrammatically in Fig. 2.

Although I have shown in Fig. 1 the source of continuous currents as consisting of an entirely independent dynamo-electric machine, it is obvious that such source of currents might be a commutator properly connected to the armature of the dynamo A, and taking current either from the same coils as the brushes D D' or from separate armature-coils.

I have illustrated in Fig. 3 an arrangement in which the source of continuous currents is a commutator W of suitable description, which connects with the brushes D D', or the rings upon which said brushes bear, and has its segments alternating in the manner well known in the art, so that when said commutator revolves in proper manner to change its connections coincidently with the alterations of current from the dynamo A a continuous or direct current will be supplied to the brushes F F' of such commutator. Said commutator being connected to the mains $c\ c'$ and to the field of the dynamo A, will serve the same purpose as the source of continuous currents E, Fig. 1.

What I claim as my invention is—

1. The combination, with an alternating-current motor having its armature fed from an alternating-current wire, of a starting electric motor connected to said armature, as and for the purpose described.

2. The combination, with an alternating-current electric motor having its armature supplied from an alternating-current circuit, of a continuous or direct current electric motor having its armature on the same shaft with the armature of said alternating-current-motor.

3. In an electric motive-power apparatus, an alternating and a continuous current motor having their armatures mounted on the same shaft and supplied from a power station with a continuous current and an alternating current, respectively, in combination with means for throwing off the current from the continuous-current motor when the alternating-current motor has been brought to speed.

4. In an alternating-current system of power-distribution, the combination of an alternating-current dynamo, an alternating-current motor, a continuous or direct current motor for bringing the same to speed, and a source of continuous or direct currents connected with said motor and with the field of the alternating-current dynamo.

5. The combination, with an alternating-current motor, of a starting-motor for bringing the same to speed, and a speed-responsive device for cutting off the current from the starting-motor when the desired speed is reached, as and for the purpose described.

6. The combination, substantially as described, of an alternating-current dynamo, an alternating-current motor, a starting electric motor, and a source of continuous or direct electric currents having connections to the fields of the alternating-current dynamo, the alternating-current motor, and to the starting electric motor.

7. The combination, substantially as described, of an alternating-current motor, an alternating-current dynamo, a starting electric motor, and circuits or connections independent of those leading to the alternating-current motor over which currents are supplied from a common source for sustaining the field of the alternating-current dynamo, the field of the alternating-current motor, and for running the starting-motor.

8. The combination, substantially as described, of an alternating-current motor connected to wire supplying alternating currents, and a starting electric motor supplied with current from a wire or source the same as that which sustains the field of the alternating motor.

9. The combination, substantially as described, of an alternating-current motor having its armature connected with an alternating-current wire or main, a continuous or direct current-supply wire, a continuous-current motor on the shaft of the former, and connections from the continuous-current-supply main to the continuous-current motor and to the field of the alternating motor.

10. In a system of power-distribution by alternating currents, the combination, with an alternating-current motor, of a wire or main carrying continuous currents and a motive-power device operated by said continuous currents and connected to the alternating-current motor for bringing the said alternating-current motor to speed.

Signed at Lynn, in the county of Essex and State of Massachusetts, this 21st day of July, A. D. 1888.

E. WILBUR RICE, JR.

Witnesses:
    J. W. GIBBONEY,
    A. L. ROHRER.